United States Patent [19]

Tomita et al.

[11] 4,054,720
[45] Oct. 18, 1977

[54] FLAME RETARDANT POLYESTER ARTICLE, METHOD FOR THE PRODUCTION OF THE SAME AND COMPOSITIONS FOR RETARDING THE FLAMMABILITY OF POLYESTER ARTICLE

[75] Inventors: Mikio Tomita, Shiga; Masahito Iimura, Tokyo; Atsumi Ueno, Kyoto, all of Japan

[73] Assignee: Meisei Chemical Works, Ltd., Kyoto, Japan

[21] Appl. No.: 582,194

[22] Filed: May 30, 1975

[30] Foreign Application Priority Data

Feb. 7, 1975 Japan .................................. 50-16560

[51] Int. Cl.$^2$ ....................... C09K 3/28; B01F 17/14; B32B 27/36; B32B 27/18
[52] U.S. Cl ............................... 428/480; 106/15 FP; 252/8.1; 252/312; 252/351; 428/921

[58] Field of Search ........................ 252/8.1, 312, 351; 428/480, 921; 106/15 FP

[56] References Cited

U.S. PATENT DOCUMENTS

| 3,660,582 | 5/1972 | Di Pietro et al. | 428/921 X |
|---|---|---|---|
| 3,729,434 | 4/1973 | Todd | 252/8.1 X |
| 3,856,535 | 12/1974 | Ferguson | 106/15 FP |
| 3,911,189 | 10/1975 | Miller | 428/921 X |
| 3,958,061 | 5/1976 | Singer et al. | 252/8.1 X |

*Primary Examiner*—Harris A. Pitlick

[57] ABSTRACT

A polyester article is treated with an aqueous emulsion of a halogenated phosphoric ester to retard its flammability. The aqueous emulsion is prepared by emulsifying a halogenated phosphoric ester with a nonionic surfactant derived from a phosphoric ester.

30 Claims, No Drawings

FLAME RETARDANT POLYESTER ARTICLE, METHOD FOR THE PRODUCTION OF THE SAME AND COMPOSITIONS FOR RETARDING THE FLAMMABILITY OF POLYESTER ARTICLE

BACKGROUND OF THE INVENTION

This invention relates to compositions for retarding the flammability of polyester articles which can be used in the form of a stable aqueous emulsion. This invention also relates to flame retardant polyester articles and the method for the production of the same.

It is known that compounds containing halogen or phosphorus are used as flame retarding agents for polyester fiber or film. For the flame retarding treatment of polyester, there are known two different typical methods. One is to improve the flame retardancy of raw materials for polyester and the other is to subject polyester articles such as fibers and films to a flame retarding treatment. In the latter case, a halogenated phosphoric ester; e.q. tris (2,3-dibromopropyl) phosphate is preferably used by the exhaustion from an aqueous dispersion, the so-called thermosol method or so-called carrier method. With any of these conventional methods, however, it has been difficult to impart to polyester articles a sufficient flame retardancy which is one of the properties of the above mentioned halogenated phosphoric ester. Especially, in the method of exhaustion from an aqueous dispersion it is necessary to prepare, for a treating bath, an emulsion of a hydrophobic compound such as tris (2,3-dibromopropyl) phosphate by the aid of a proper emulsifier. It is also required to obtain a homogeneous and stable emulsion for the purpose of uniform treatment of polyester fiber or film with a fire retarding agent. However, in many cases the flame retarding agents are degraded by the addition of conventional emulsifiers. It is considered that this is partly due to the properties of the emulsifiers per se and partly depends on the amount of the emulsifiers used. For example, in the case of emulsification of tris (2,3-dibromopropyl) phosphate with higher fatty acid- ethylene oxide adduct which is known as a favorable emulsifier therefor, the flame retarding ability of tris(2,3-dibromopropyl) phosphate is greatly reduced in accordance with an increase in the amount of the emulsifier as shown in the following table. Consequently, a satisfactory flame retarding effect can hardly be expected if a stable emulsion is used for the purpose of uniform application of the flame retarding agent to the polyester article.

| Concentration of TDPP in a bath % by weight | Amount of emulsifier % by weight (based on TDPP) | Stability of emulsion in a bath | Oxygen Index (JIS-K-7201 -1972) |
|---|---|---|---|
| 15 | — | — | 31.5 |
| 15 | 5 | bad | 27.0 |
| 15 | 7.5 | " | 26.5 |
| 15 | 10 | " | 26.5 |
| 15 | 20 | good | 25.0 |
| Untreated cloth | | | 23.5 |

TDPP: tris (2,3-dibromopropyl) phosphate Emulsifier: polyethylene glycol stearyl ether Cloth to be treated: polyester taffeta The principal object of the invention is therefore to provide a new and improved flame retardant composition for polyester which can be used in the form of a stable emulsion without sacrificing the good flame retardancy of halogenated phosphoric ester.

The other objects and advantages of the invention will become clear from the following detailed description of the invention.

SUMMARY OF THE INVENTION

The flame retardant composition for polyester according to the invention consists essentially of an aqueous emulsion of a halogenated phosphoric ester. The aqueous emulsion is prepared by emulsifying a halogenated phosphoric ester with a nonionic surfactant emulsifier which is derived from a phosphoric ester. The amount of the halogenated phosphoric ester should be within the range of 7 to 20% by weight with respect to the total amount of the whole aqueous emulsion system.

In a preferred embodiment of the invention the flame retardant composition may further include an organic solvent in an amount within the range of 3 to 10% by weight with respect to the total amount of the aqueous emulsion system.

DETAILED DESCRIPTION OF THE INVENTION

The halogenated phosphoric ester used for the flame detardant composition according to the invention may be selected from the group consisting of tris(2,3-dibromopropyl)phosphate, tris (2,3-dichloropropyl)-phosphate, tris (2-chloroethyl)phosphate and tris (bromochloropropyl)phosphate.

The above mentioned halogenated phosphoric ester is emulsified with use of a nonionic surfactant emulsifier which may be a compound obtained by esterification of a polyethylene glycol ether or a polypropylene glycol ether of a higher alcohol or an alkylphenol with a phosphoric esterifying agent. The phosphoric esterifying agent may be a member selected from the group consisting of phosphorus pentoxide, phosphorus oxychloride and phosphorus trichloride. More desirably, the nonionic surfactant emulsifier may be a compound obtained by phosphoric esterification of an addition product of 5 to 15 moles of ethylene oxide to a saturated or unsaturated alcohol having 8 to 20 carbon atoms. One of the most preferred compounds for the emulsifier is a monophosphoric ester obtained by esterification of an addition product of 5 to 15 moles of ethylene oxide to a saturated or unsaturated alcohol having 8 to 20 carbon atoms with phosphorus pentoxide. Any conventional methods may be utilized to synthesize these esters used as emulsifiers. For example the synthesis of monoesters with use of phosphorus pentoxide may be carried out in such a manner as disclosed in Japanese Patent Publication No. 14,416 of 1966.

The amount of the above mentioned nonionic surfactant emulsifier should be within the range of 5 to 20% by weight with respect to the amount of the halogenated phosphoric ester.

The aqueous emulsion of a halogenated phosphoric ester prepared according to the invention shows a good stability with use of a small amount of the specified emulsifiers in addition to the fact that no appreciable degradation of the antiflamable property of the halogenated phosphoric ester can be formed. Further, in some cases, if the amount of the emulsifier is properly controlled, the flame retardancy can be enhanced in comparison with the case of utilizing the halogenated phosphoric ester in an organic solvent solutions without any emulsifier.

In emulsification of a halogenated phosphoric ester with an emulsifier described, an organic chlorinated solvent such as perchloroethylene or trichloroethylene may preferably be used in an adequate amount to obtain a more stable emulsion. Particularly, addition of such an organic solvent is desirous when the total amount of the halogenated phosphoric ester and the specified emulsifier is less than 60% by weight with respect to the amount of the whole aqueous emulsion system.

The flame detardant composition according to the invention may be prepared in a stable emulsion whether it is in the form of a concentrated emulsion or in the form of a dilute emulsion. The concentration of the system can be diluted by water at any rate at will when used. The flame retardant compositions of the invention also has a good workability on drying finds their greatest usefulness in reducing and retarding the flammability of polyester articles such as polyester film or fibrous material.

PREFERRED EMBODIMENTS OF THE INVENTION

The following example illustrates the invention in further detail. In this example "%" and "parts" indicate % by weight and parts by weight, respectively.

EXAMPLES

An addition product of 1 mol of oleyl alcohol and 5 mols of ethylene oxide was esterified with phosphorus pentoxide to obtain phosphoric ester containing mono-ester compound at a content of 80%.

Four and one-half (4.5) parts of the above phosphoric ester and 30 parts of perchloroethylene were added to 90 parts of tris(2,3-dibromopropyl) phosphate and mixed uniformly at 40° C. Then, 33 parts of water was added to the resultant mixture with continuous stirring by homomixer to obtain 157.5 parts of homogeneous milk-white emulsion. The obtained emulsion was very stable after standing for a long time.

And then, 26 parts of the above emulsion was diluted with water to 100 parts to form a flame retarding treatment bath.

Polyester taffeta was soaked in a bath of the resultant treatment liquid and squeezed to wet pick-up 65%. Then, this treated polyester taffeta was dried at 120° C for 5 minutes.

For controls, various treatment baths were prepared by emulsification of tris (2,3-dibromopropyl) phosphate with different amounts of the above phosphoric ester and with other conventional surfactants. Polyester taffeta was treated with each treatment bath in the same manner as the above. Each treated cloth was measured its flammability by the Oxygen Index Method which is used in testing of flammability of polymeric materials (JILS-K-7201-1972). The results are shown in the following table.

| | Composition of treatment bath | | | | | | |
|---|---|---|---|---|---|---|---|
| Text No. | Concentration of TDPP in a bath % | Emulsifier | Amount of Emulsifier % (based on TDPP) | Concentration of perchloroethylene in a bath % | Stability of emulsion in a bath | wet pick-up % | Oxygen Index |
| 1 | 15 | — | — | 85 | — | 65 | 31.5 |
| 2 | 15 | phosphoric ester described in example | 5 | 5 | good | 65 | 32.0 |
| 3 | 15 | " | 7.5 | 5 | good | 65 | 32.5 |
| 4 | 15 | " | 10 | 5 | good | 65 | 32.5 |
| 5 | 15 | " | 15 | 5 | good | 65 | 32.0 |
| 6 | 15 | " | 20 | 5 | good | 65 | 31.5 |
| 7 | 15 | polyoxyethylene stearyl ether | 5 | 5 | bad | 65 | 27.0 |
| 8 | 15 | " | 10 | 5 | bad | 65 | 26.5 |
| 9 | 15 | " | 20 | 5 | good | 65 | 25.0 |
| 10 | 15 | polyoxyethylene sorbitan monooleate | 5 | 5 | bad | 65 | 26.5 |
| 11 | 15 | " | 10 | 5 | fairly good | 65 | 25.0 |
| 12 | 15 | " | 20 | 5 | good | 65 | 23.0 |
| 13 | | Untreated cloth | | | | | 23.0 |

TDPP: tris (2,3-dibromopropyl)phosphate

As is clear from the above results, the treatment baths containing treating agents according to the invention (Test No. 2-6) showed an excellent flame retarding effect and stability during the process, in comparison with the baths containing the other surfactants (Test No. 7-12). And, the cloths treated with treating agents of the invention showed the same or more excellent properties as that of the cloth treated with perchloroethylene solution of tris (2,3-dibromopropyl) phosphate (Test No. 1).

What we claim is:

1. A flame retardant composition useful in making stable aqueous emulsions for treatment of polyester consisting essentially of a halogenated phosphoric ester and 5 percent to 20 percent by weight of said halogenated phosphoric ester of a nonionic surfactant emulsifier obtained by esterification of a polyethylene glycol ether of a higher alcohol, a polypropylene glycol ether of a higher alcohol, or an alkyl phenol with a phosphoric esterifying agent.

2. A flame retardant composition as defined in claim 1, in which said halogenated phosphoric ester is a member selected from the group consisting of tris(2,3-dibromopropyl) phosphate, tris (2,3-dichloropropyl) phosphate, tris(2-chloroethyl) phosphate and tris (bromochloropropyl) phosphate.

3. A flame retardant composition as defined in claim 1, in which said phosphoric esterifying agent is a member selected from the group consisting of phosphorus pentoxide, phosphorus oxychloride and phosphorus trichloride.

4. A flame retardant composition as defined in claim 1, in which said nonionic surfactant emulsifier is a compound obtained by phosphoric esterification of an addition product of 5 to 15 moles of ethylene oxide to a saturated or unsaturated alcohol having 8 to 20 carbon atoms.

5. A flame retardant composition as defined in claim 4, in which said nonionic surfactant emulsifier is a monophosphoric ester obtained by esterification of an addition product of 5 to 15 moles of ethylene oxide to a saturated or unsaturated alcohol having 8 to 20 carbon atoms with phosphorus pentoxide.

6. A flame retardant composition as defined in claim 1, further including an organic solvent present in an amount of 3 percent to 10 percent by weight of the total aqueous emulsion.

7. A flame retardant composition as defined in claim 6, in which said organic solvent is selected from the group consisting of perchloroethylene and trichloroethylene.

8. An aqueous emulsion of the composition of claim 1 wherein said halogenated phosphoric ester is present in an amount of 7 percent to 20 percent by weight of the total amount of said emulsion.

9. A method for the flame retarding treatment of polyester consisting essentially of treating a polyester article with a composition including a halogenated phosphoric ester and 5 percent to 20 percent by weight of said halogenated phosphoric ester of a nonionic surfactant emulsifier derived by esterification of a polyethylene glycol ether of a higher alcohol, a polypropylene glycol ether of a higher alcohol, or an alkyl phenol with a phosphoric esterifying agent, said halogenated phosphoric ester and surfactant emulsifier being admixed with an amount of water sufficient to form a stable aqueous emulsion.

10. A method for the flame retarding treatment of polyester as defined in claim 9 in which said halogenated phosphoric ester is present in an amount of 7 percent to 20 percent by weight with respect to the total amount of said aqueous emulsion.

11. A method for the flame retarding treatment of polyester as defined in claim 10, in which said halogenated phosphoric ester is a member selected from the group consisting of tris(2,3-dibromopropyl) phosphate, tris (2,3-dichloropropyl) phosphate, tris (2-chloroethyl) phosphate, and tris (bromochloropropyl) phosphate.

12. A method for the flame retarding treatment of polyester as defined in claim 10, in which said phosphoric esterifying agent is a member selected from the group consisting of phosphorus pentoxide, phosphorus oxychloride and phosphorus trichloride.

13. A method for the flame retarding treatment of polyester as defined in claim 12, in which said nonionic surfactant emulsifier is a compound obtained by phosphoric esterification of an addition product of 5 to 15 moles of ethylene oxide to a saturated or unsaturated alcohol having 8 to 20 carbon atoms.

14. A method for the flame retarding treatment of polyester as defined in claim 13, in which said nonionic surfactant emulsifier is a mono phosphoric ester obtained by esterification of an addition product of 5 to 15 moles of ethylene oxide to a saturated or unsaturated alcohol having 8 to 20 carbon atoms with phosphorus pentoxide.

15. A method for the flame retarding treatment of polyester as defined in claim 9, in which said composition further includes 3 percent to 10 percent by weight of the total emulsion of an organic solvent.

16. A method as claimed in claim 15 wherein said organic solvent is a chlorinated organic solvent.

17. A method for the flame retarding treatment of polyester as defined in claim 16, in which said organic solvent is selected from the group consisting of perchloroethylene and trichloroethylene.

18. A flame retardant polyester article obtained by treating a polyester article with a flame retardant composition consisting essentially of an aqueous emulsion of a halogenated phosphoric ester present in said emulsion in an amount by weight thereof at 7 percent to 20 percent by weight; and 5 percent to 20 percent by weight of said halogenated phosphoric ester of a nonionic surfactant emulsifier derived from the esterification of a polyethylene glycol ether of a higher alcohol, a polypropylene glycol ether of a higher alcohol or an alkyl phenol with a phosphoric esterifying agent.

19. A flame retardant polyester article as defined in claim 18, in which said halogenated phosphoric ester is a member selected from the group consisting of tris(2,3-dibromopropyl) phosphate, tris (2,3-dichloropropyl) phosphate, tris(2-chloroethyl) phosphate, and tris (bromochloropropyl) phosphate.

20. A flame retardant polyester article as defined in claim 18, in which said phosphoric esterifying agent is a member selected from the group consisting of phosphorus pentoxide, phosphorus oxychloride and phosphorus trichloride.

21. A flame retardant polyester article as defined in claim 18, in which said nonionic surfactant emulsifier is a compound obtained by phosphoric esterification of an addition product of 5 to 15 moles of ethylene oxide to a saturated or unsaturated alcohol having 8 to 20 carbon atoms.

22. A flame retardant polyester article as defined in claim 18, in which said nonionic surfactant emulsifier is a monophosphoric ester obtained by esterification of an addition product of 5 to 15 moles of ethylene oxide to a saturated or unsaturated alcohol having 8 to 20 carbon atoms with phosphorus pentoxide.

23. A flame retardant polyester article as defined in claim 18, wherein said treating composition further includes an organic solvent in an amount by weight of the total amount of said aqueous emulsion of 3 percent to 10 percent.

24. A flame retardant polyester article as defined in claim 23, in which said organic solvent is selected from the group consisting of perchloroethylene and trichloroethylene.

25. A method of making a flame retardant aqueous emulsion for treating a polyester article consisting essentially of admixing water, 7 percent to 20 percent by weight of the total emulsion of a halogenated phosphoric ester; and 5 percent to 20 percent by weight of said halogenated phosphoric ester of a nonionic surfactant emulsifier obtained by esterification of a polyethylene glycol ether of a higher alcohol, a polypropylene glycol ether of a higher alcohol or an alkyl phenol with a phosphoric esterifying agent.

26. The method as claimed in claim 25 wherein there is further incorporated in said emulsion from 3 percent to 10 percent of an organic solvent by weight of said total emulsion.

27. The method as claimed in claim 26 wherein said solvent is a chlorinated organic solvent.

28. The method as claimed in claim 27 wherein said chlorinated organic solvent is perchloroethylene or trichloroethylene.

29. A method as claimed in claim 25 wherein said phosphoric esterifying agent is a member selected from the group consisting of phosphorus pentoxide, phosphorus oxychloride and phosphorus trichloride.

30. A method as claimed in claim 29 wherein said halogenated phosphoric ester is a member selected from the group consisting of tris (2,3-dibromopropyl) phosphate, tris (2,3-dichloropropyl) phosphate, tris (2-chloroethyl) phosphate, and tris (bromochloropropyl) phosphate.

* * * * *